(12) United States Patent
Forgette et al.

(10) Patent No.: US 10,562,460 B2
(45) Date of Patent: Feb. 18, 2020

(54) VEHICLE MULTI-FUNCTION ACCESSORY RAIL SYSTEMS

(71) Applicant: FORD GLOBAL TECHNOLOGIES, LLC, Dearborn, MI (US)

(72) Inventors: Paul Alan Forgette, Brownstown, MI (US); Jeffrey Charles Paddock, Dearborn Heights, MI (US); Robert Ralph Armitage, Howell, MI (US); Anna Miller Hill, Belleville, MI (US); Michael Timothy Feiten, Farmington, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 33 days.

(21) Appl. No.: 15/924,755

(22) Filed: Mar. 19, 2018

(65) Prior Publication Data

US 2019/0283681 A1  Sep. 19, 2019

(51) Int. Cl.
| | |
|---|---|
| *B60R 21/213* | (2011.01) |
| *B60R 9/042* | (2006.01) |
| *B60J 7/11* | (2006.01) |
| *B60R 7/08* | (2006.01) |
| *B60R 9/045* | (2006.01) |
| *B60R 9/048* | (2006.01) |
| *B60R 9/058* | (2006.01) |
| *B60R 21/232* | (2011.01) |
| *B60R 11/00* | (2006.01) |

(52) U.S. Cl.
CPC .............. *B60R 9/042* (2013.01); *B60J 7/11* (2013.01); *B60R 7/08* (2013.01); *B60R 9/045* (2013.01); *B60R 9/048* (2013.01); *B60R 9/058* (2013.01); *B60R 21/232* (2013.01); *B60R 2011/0028* (2013.01)

(58) Field of Classification Search
CPC ......... B60R 9/042; B60R 9/045; B60R 9/058; B60R 21/232; B60R 2011/0028; B60R 21/213; B60R 21/214; B60J 7/11
See application file for complete search history.

(56) References Cited

U.S. PATENT DOCUMENTS

| | | | | |
|---|---|---|---|---|
| 5,540,476 A | * | 7/1996 | Cowsert | B60J 1/1815 160/392 |
| 5,540,478 A | * | 7/1996 | Schuch | B60J 7/04 224/331 |
| 5,599,086 A | | 2/1997 | Dutta | |
| 6,530,621 B1 | * | 3/2003 | Williams | B60J 7/102 224/326 |

(Continued)

FOREIGN PATENT DOCUMENTS

DE  10 2010 005703 A1  9/2011

*Primary Examiner* — Corey N Skurdal
(74) *Attorney, Agent, or Firm* — Vichit Chea; Carlson, Gaskey & Olds

(57) ABSTRACT

This disclosure details accessory rail systems for securing various accessory devices to vehicles that are equipped with either standard roofs or roofs with one or more roof openings. An exemplary accessory rail system includes an accessory rail that is configured to simultaneously mount one or more interior accessories and/or one or more exterior accessories relative to the vehicle. A trim piece may be secured to the accessory rail, and an airbag curtain may be secured to either the accessory rail, the trim piece, or a roof frame rail.

19 Claims, 5 Drawing Sheets

(56) References Cited

U.S. PATENT DOCUMENTS

| | | | |
|---|---|---|---|
| 7,097,225 B2 | 8/2006 | Huisingh et al. | |
| 2005/0280292 A1* | 12/2005 | Reitzloff | B60J 1/14 296/219 |
| 2009/0127834 A1* | 5/2009 | Hemingway | B60N 3/026 280/728.2 |
| 2009/0189381 A1 | 7/2009 | Kirtland | |
| 2016/0046241 A1* | 2/2016 | Crismon | B60J 7/106 224/326 |
| 2016/0167614 A1* | 6/2016 | Inami | B60R 13/0206 280/730.2 |
| 2017/0225550 A1 | 8/2017 | Janseen | |
| 2019/0039553 A1* | 2/2019 | Komura | B60J 10/7775 |

\* cited by examiner

VEHICLE MULTI-FUNCTION ACCESSORY RAIL SYSTEMS

TECHNICAL FIELD

This disclosure relates to accessory rail systems for mounting accessories to vehicles.

BACKGROUND

Some vehicle roofs include roof structures that may be either opened or removed from the vehicle to provide vehicle passengers with an open air riding experience. Owners of these types of vehicles often desire to mount various accessory devices to their vehicles.

SUMMARY

A vehicle accessory rail system according to an exemplary aspect of the present disclosure includes, among other things, an accessory rail including a first side, a second side, a third side, and a fourth side. A first longitudinal groove is disposed on the first side, a second longitudinal groove is disposed on the second side, and a trim piece is secured at the third side.

In a further non-limiting embodiment of the foregoing system, the accessory rail is an extruded aluminum rail.

In a further non-limiting embodiment of either of the foregoing systems, an airbag curtain is deployable between a first position behind the trim piece and a second position outward of the trim piece.

In a further non-limiting embodiment of any of the foregoing systems, the airbag curtain is mounted to a mounting flange that extends from the third side of the accessory rail.

In a further non-limiting embodiment of any of the foregoing systems, a first accessory device is movably mounted within the first longitudinal groove and a second accessory device is movably mounted within the second longitudinal groove.

In a further non-limiting embodiment of any of the foregoing systems, the first accessory device is an exterior accessory device and the second accessory device is an interior accessory device.

In a further non-limiting embodiment of any of the foregoing systems, a third longitudinal groove is on the third side and a fourth longitudinal groove is on the fourth side.

In a further non-limiting embodiment of any of the foregoing systems, the trim piece is secured to a ledge that extends from the third side.

In a further non-limiting embodiment of any of the foregoing systems, one of a socket portion and a ball-shaped portion of a ball and socket joint extends from the third side and is configured to connect to the other of the socket portion and the ball-shaped portion of the trim piece.

In a further non-limiting embodiment of any of the foregoing systems, a portion of a roller shade or a retractable soft top is slidingly received with the first longitudinal groove.

A vehicle according to another exemplary aspect of the present disclosure includes, among other things, a roof including a first frame rail. An accessory rail is secured to the first frame rail and configured to mount a first accessory and a second accessory relative to the vehicle. A trim piece is secured to the accessory rail, and an airbag curtain is secured to the accessory rail or the first frame rail.

In a further non-limiting embodiment of the foregoing vehicle, the roof includes a roof opening, and the first accessory is an exterior accessory that extends at least partially through the roof opening.

In a further non-limiting embodiment of either of the foregoing vehicles, the first accessory is an exterior accessory movably secured within a first longitudinal groove at a first side of the accessory rail, and the second accessory is an interior accessory movably secured within a second longitudinal groove at a second side of the accessory rail.

In a further non-limiting embodiment of any of the foregoing vehicles, the trim piece is secured at a third side of the accessory rail, and a fourth side of the accessory rail is mounted to the first frame rail.

In a further non-limiting embodiment of any of the foregoing vehicles, the accessory rail is secured to the first frame rail by a fastener, and once mounted to the first frame rail, the fastener is accessible only from an opposite side of the accessory rail.

In a further non-limiting embodiment of any of the foregoing vehicles, the first accessory and the second accessory are both interior accessories slidably received within the accessory rail.

In a further non-limiting embodiment of any of the foregoing vehicles, a seal is disposed axially between the accessory rail and the first frame rail.

In a further non-limiting embodiment of any of the foregoing vehicles, the accessory rail includes a longitudinal groove configured to receive a bracket of a roof structure of the roof.

In a further non-limiting embodiment of any of the foregoing vehicles, the airbag curtain is mounted to a mounting flange that extends from the accessory rail.

In a further non-limiting embodiment of any of the foregoing vehicles, the trim piece includes a bent end portion that is press fit into a gap between a ledge and a side of the accessory rail.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details accessory rail systems for securing various accessory devices to vehicles that are equipped with standard roofs or roofs with one or more roof openings. An exemplary accessory rail system includes an accessory rail that is configured to simultaneously mount one or more interior accessories and one or more exterior accessories relative to the vehicle. A trim piece may be secured to the accessory rail, and an airbag curtain may be secured to either the accessory rail, the trim piece, or a roof frame rail. These and other features of this disclosure are described in greater detail below.

Figure 1:
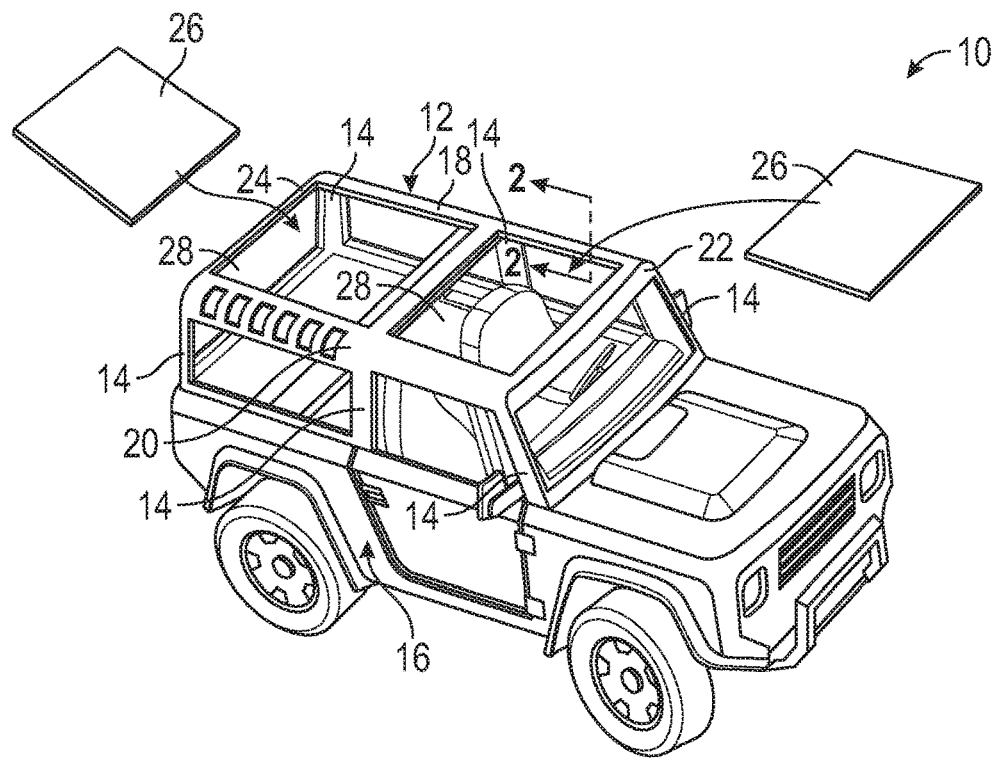
FIG. 1 illustrates a vehicle having roof openings.

FIG. 1 illustrates a vehicle 10. The vehicle 10 may be a car, a truck, a van, a sport utility vehicle (SUV), or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a roof 12 supported by a plurality of pillars 14 (e.g., A-pillars, which are closest the front of the vehicle 10, C-pillars, or the pillars closest to the rear of the vehicle 10, and B-pillars or intermediate pillars, which are between the A-pillars and the rear most pillars) of a vehicle body 16. The roof 12 may include a first frame rail 18 and a second frame rail 20 extending longitudinally between the front and the rear of the vehicle 10, and a third frame rail 22 and a fourth frame rail 24 extending horizontally between the first and second frame rails 18, 20.

The roof 12 may include one or more roof structures 26 that can either be opened or removed from the roof 12 to expose openings 28. When exposed, the openings 28 provide an open air riding experience to the vehicle occupants. In the illustrated embodiment, the roof 12 includes two removable roof structures 26. However, the total number of roof structures 26 and openings 28 provided within the roof 12 are not intended to limit this disclosure. In addition, although the roof structures 26 are illustrated as being removable from the vehicle 10, the roof structures 26 could alternatively be opened to expose the openings 28 without completely removing the roof structures 26 from the vehicle 10.

Figure 2:
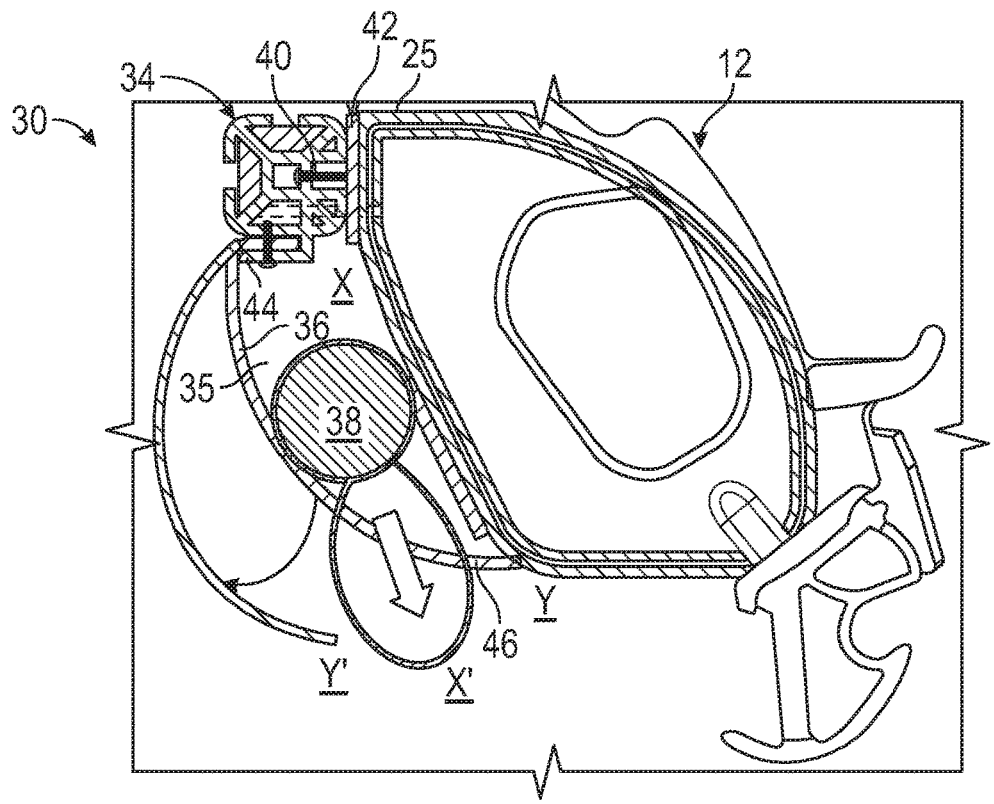
FIG. 2 is a cross-sectional view through section 2-2 of FIG. 1 and illustrates an accessory rail system for mounting accessories to the vehicle according to an embodiment of this disclosure.
Figure 3:
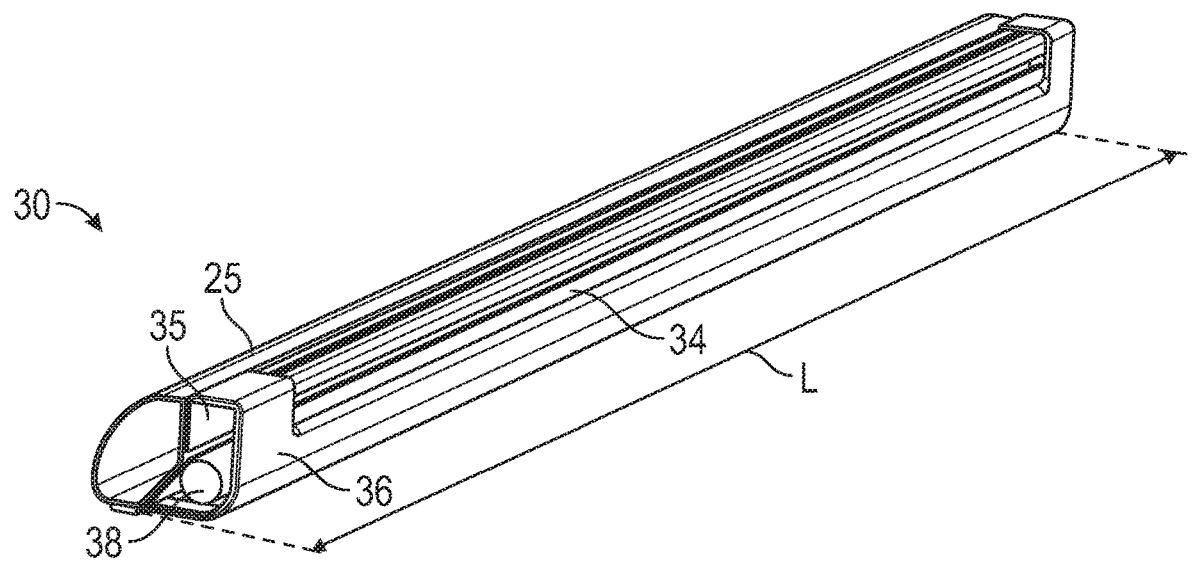
FIG. 3 is a perspective view of the accessory rail system of FIG. 2.
Figure 4:
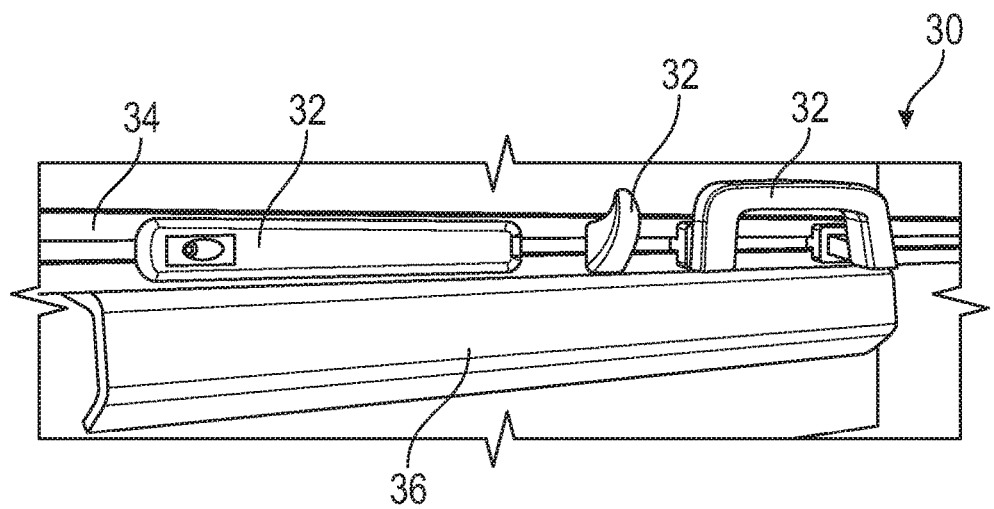
FIG. 4 illustrates various accessory devices that may be secured to the accessory rail system of FIG. 2.

FIGS. 2, 3, and 4, with continued reference to FIG. 1, illustrate an accessory rail system 30 for mounting various accessory devices (see reference numeral 32 of FIG. 4) relative to the vehicle 10. As depicted in FIG. 2, the accessory rail system 30 is secured to a frame rail 25 of the roof 12. The frame rail 25 may be representative of any of the frame rails 18, 20, 22, and 24 shown in FIG. 1. An accessory rail system can be secured to any of the frame rails 18-24 for securing accessory devices at any side of the roof 12 of the vehicle 10.

Each accessory rail system 30 may include an accessory rail 34, a trim piece 36, and an airbag curtain 38. The accessory rail 34 may be mounted to the frame rail 25 of the roof 12. In an embodiment, the accessory rail 34 is mounted to the frame rail 25 using one or more fasteners 40. The fasteners 40 may be bolts, screws, or any other mechanical fastening device. In another embodiment, the accessory rail 34 is welded to the frame rail 25 either in place of or in addition to the fasteners 40.

A seal 42 may be disposed axially between the accessory rail 34 and the frame rail 25. The seal 42 substantially prevents moisture from entering the passenger cabin of the vehicle 10 between the accessory rail 34 and the frame rail 25. In an embodiment, the seal 42 is a foam seal. However, other types of seals may also be suitable for sealing between the accessory rail 34 and the frame rail 25.

The trim piece 36 may be secured to the accessory rail 34 at a different side of the accessory rail 34 than that which is secured to the frame rail 25. The trim piece 36 may include any design for providing an aesthetic quality to the passenger cabin of the vehicle 10. In an embodiment, the trim piece 36 includes a curved body that extends between a bent proximal end 44 and a distal end 46. The bent proximal end 44 is secured to the accessory rail 34, and the distal end 46 is at least partially contiguous with the frame rail 25 when the accessory rail system 30 is fully assembled.

The airbag curtain 38 is an exemplary airbag of a safety system of the vehicle 10. In an embodiment, the airbag curtain 38 is a side airbag curtain positioned within a cavity 35 established by the trim piece 36, the frame rail 25, and the accessory rail 34.

The airbag curtain 38 is an inflatable device that may be deployed between a first position X and a second position X' in response to a vehicle impact event. In the first position X, the airbag curtain 38 is concealed behind the trim piece 36. In the second position X', the airbag curtain 38 is deployed outwardly from the trim piece 36 in order to protect occupants of the vehicle 10 during the vehicle impact event. The trim piece 36 may deflect outwardly from a first position Y to a second position Y' as the airbag curtain 38 is inflated toward the second position X'. The attachment location of the trim piece 36 to the accessory rail 34 acts as a hinge point for pivoting the trim piece 36 between the first position Y and the second position Y'. The accessory rail system 30 is designed such that neither the accessory rail 34 nor the trim piece 36 interferes with the deployment of the airbag curtain 38 during vehicle impact events.

The airbag curtain 38 may be mounted to the frame rail 25 (see, e.g., FIGS. 2 and 3) or can be mounted to a portion of the accessory rail 34 (see, e.g., FIGS. 8-10, which are discussed below). The airbag curtain 38 could alternatively be mounted to the trim piece 36 within the scope of this disclosure.

Referring to FIG. 3, the accessory rail system 30 may include a length L. In an embodiment, the length L extends from the A-pillar to the C-pillar of the vehicle body 16. However, the size of the accessory rail system 30 is not intended to limit this disclosure.

Referring now to FIG. 4, a plurality of accessory devices 32 may be removably mounted relative to the vehicle 10 by using the accessory rail 34 of the accessory rail system 30. The accessory devices 32 may include interior accessory devices and/or exterior accessory devices. When mounted, the interior accessory devices generally extend inside of the vehicle 10 and the exterior accessory devices may protrude at least partially outwardly from the openings 28 of the roof 12.

Non-limiting examples of interior accessory devices that may be mounted relative to the vehicle 10 using the accessory rail systems 30 include grab handles, coat hooks, ingress/egress lights, ambient lighting, map/reading lamp holders, interior hammocks, sunglass bin holders, cargo bin holders, dog guard bezels and nets, clothing bars, speaker mounts, camera mounts, USB port mounts, conversation mirrors, sun shades, fishing rod holders, video screens, cargo nets, beverage containers, phone holders/chargers, and window visors.

Non-limiting examples of exterior accessory devices that may be mounted relative to the vehicle 10 using the accessory rail systems 30 include hard top hold downs, soft top hold downs, bikini top hold downs, sun shades, tents, bike racks, boat/surfboard/paddleboard/kayak racks, cargo nets, exterior hammocks, speaker mounts, camera mounts, spot lights, shower mounts, solar panel mounts, electric winch pods, and cargo racks.

Figure 5A:
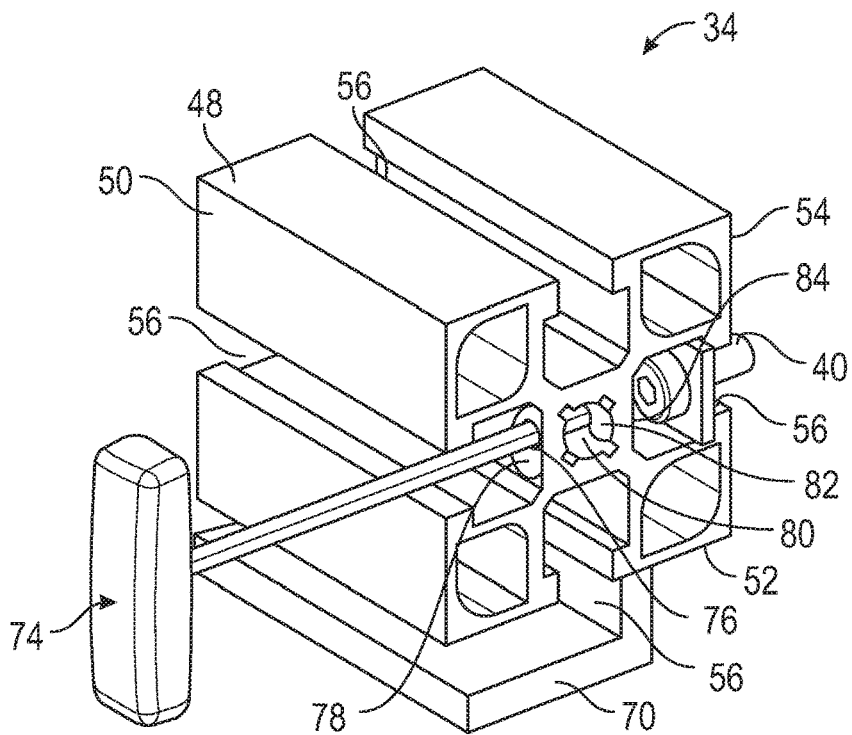
FIGS. 5A and 5B illustrate an accessory rail of the accessory rail system of FIG. 2.
Figure 5B:
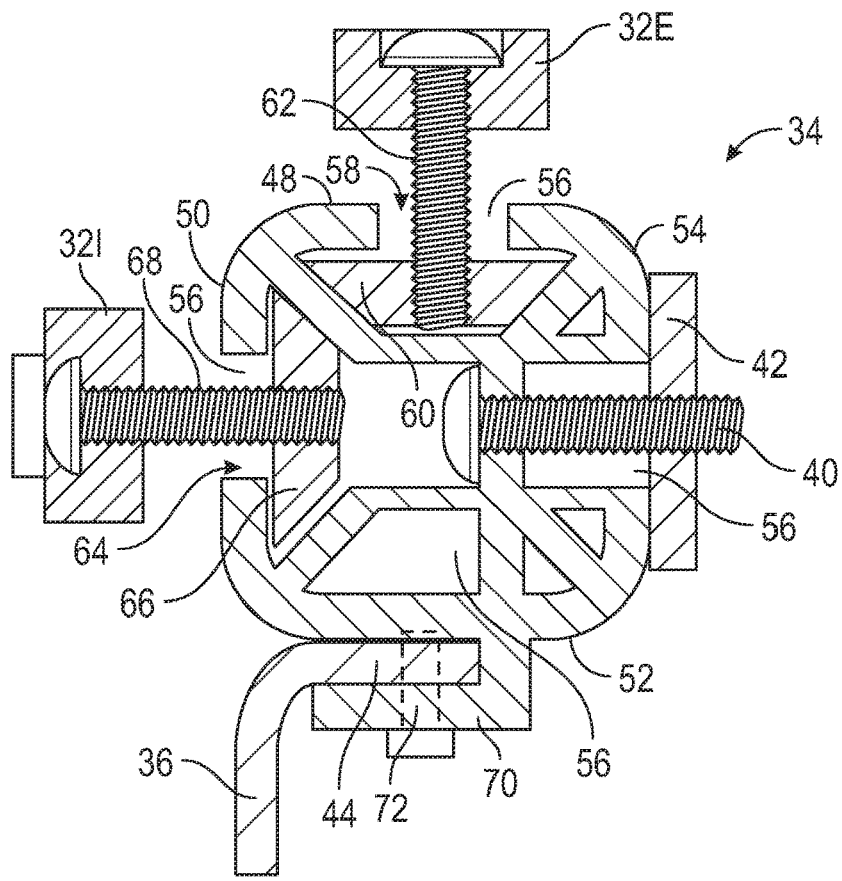

FIGS. 5A and 5B illustrate additional features of the accessory rail 34 of the accessory rail system 30. FIG. 5A is a perspective view of the accessory rail 34, whereas FIG. 5B is a cross-sectional view of the accessory rail 34.

In an embodiment, the accessory rail 34 includes an extruded aluminum body. However, other manufacturing techniques and materials may be used to construct the accessory rail 34 within the scope of this disclosure.

The accessory rail 34 may include a first side 48, a second side 50, a third side 52, and a fourth side 54. Each of the first side 48, the second side 50, the third side 52, and the fourth side 54 may include a longitudinal groove 56. In an embodiment, the longitudinal grooves 56 extend across an entire length of each of the first side 48, the second side 50, the third side 52, and the fourth side 54 of the accessory rail 34. In another embodiment, the longitudinal grooves 56 are T-shaped grooves.

The longitudinal groove 56 of the first side 48 of the accessory rail 34 is configured to receive an attachment assembly 58 of one or more exterior accessory devices 32E (shown schematically). The attachment assembly 58 may include a slider 60 and a fastener 62 that is secured to the slider 60 and protrudes outwardly of the longitudinal groove 56 for achieving attachment to the exterior accessory device 32E. The slider 60 may be moved within the longitudinal groove 56 to position the exterior accessory device 32E at a desired location relative to the accessory rail 34. The fastener 62 may be tightened relative to the slider 60 to temporarily lock the positioning of the exterior accessory device 32E relative to the accessory rail 34.

The longitudinal groove 56 of the second side 50 of the accessory rail 34 is configured to receive an attachment assembly 64 of one or more interior accessory devices 321 (shown schematically). The attachment assembly 64 may include a slider 66 and a fastener 68 that is secured to the slider 66 and protrudes outwardly of the longitudinal groove 56 for achieving attachment to the interior accessory device 321. The slider 66 may be moved within the longitudinal groove 56 to position the interior accessory device 321 at a desired location relative to the accessory rail 34. The fastener 68 may be tightened relative to the slider 66 to temporarily lock the positioning of the interior accessory device 32E relative to the accessory rail 34.

In an embodiment, the attachment assemblies 58, 64 include a universal design for simplifying installation and removal of the accessory devices 32E, 321 relative to the vehicle 10. Other attachment mechanism configurations could also be employed within the scope of this disclosure.

A ledge 70 may extend downwardly from the third side 52 of the accessory rail 34. The trim piece 36 may be secured to the accessory rail 34 by inserting the bent proximal end 44 into gap that extends between the ledge 70 and the third side 52 of the accessory rail 34. In an embodiment, the bent proximal end 44 of the trim piece 36 is press fit into the gap between the ledge 70 and the third side 52. In another embodiment, the bent proximal end 44 of the trim piece 36 is fastened to the accessory rail 34 by inserting one or more fasteners 72 through the ledge 70 and the bent proximal end 44 of the trim piece 36.

The longitudinal groove 56 of the fourth side 54 of the accessory rail 34 may be configured to receive the fastener(s) 40 for mounting the accessory rail 34 to the frame rail 25 of the roof 12. In an embodiment, each fastener 40 is hidden at a depth inside the accessory rail 34. The fastener 40 may be inserted into or removed from the longitudinal groove 56 of the fourth side 54 by inserting a driver tool 74 (see FIG. 5A) and the connected fastener 40 through the longitudinal groove 56 of the second side 50, which is opposite from the fourth side 54, then through a first opening 76 in a floor 78 of the longitudinal groove 56 of the second side 50, then across a central bore 80 of the accessory rail 34, and then through a second opening 82 in a floor 84 of the longitudinal groove 56 of the fourth side 54.

Figure 6:
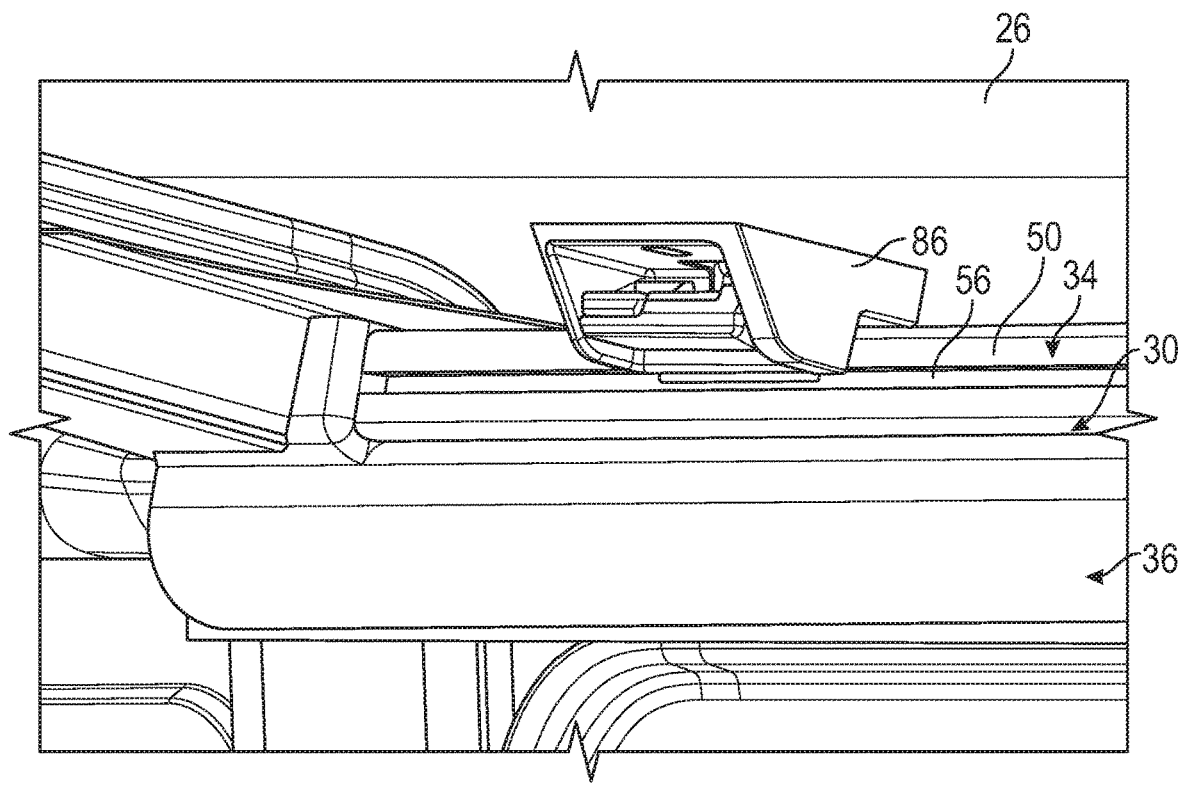
FIG. 6 illustrates portions of a vehicle roof having a roof structure that can be secured to an accessory rail system.

Referring to FIG. 6, the accessory rail system 30 described above may additionally provide attachment points for securing one or more roof structures 26 to the roof 12 of the vehicle 10. For example, brackets 86 of the roof structures 26 may latch within one of the longitudinal grooves 56 of the accessory rail 34 of the accessory rail system 30. As illustrated in FIG. 6, the brackets 86 may latch within the longitudinal groove 56 of the second side 50 of the accessory rail 34.

Figure 7:
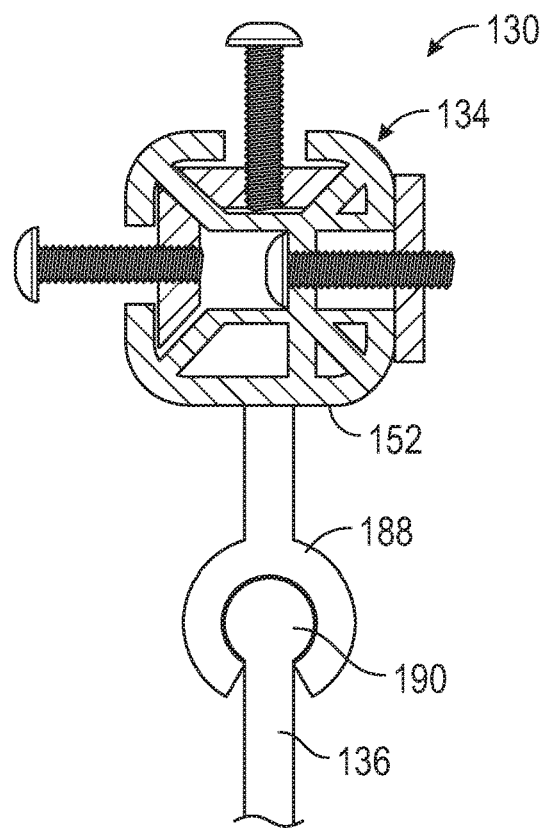
FIG. 7 illustrates an accessory rail system according to another embodiment of this disclosure.

FIG. 7 illustrates another exemplary accessory rail system 130. In this embodiment, the accessory rail system 130 includes an accessory rail 134 and a trim piece 136. The trim piece 136 may be secured to the accessory rail 134 using a ball and socket joint. For example, a socket portion 188 may extend from a side 152 of the accessory rail 134 and is configured to receive a ball-shaped portion 190 of the trim piece 136. Of course, an opposite configuration is also contemplated in which the trim piece 136 provides the socket portion of the ball and socket joint and the accessory rail 134 provides the ball portion of the ball and socket joint.

Figure 8:
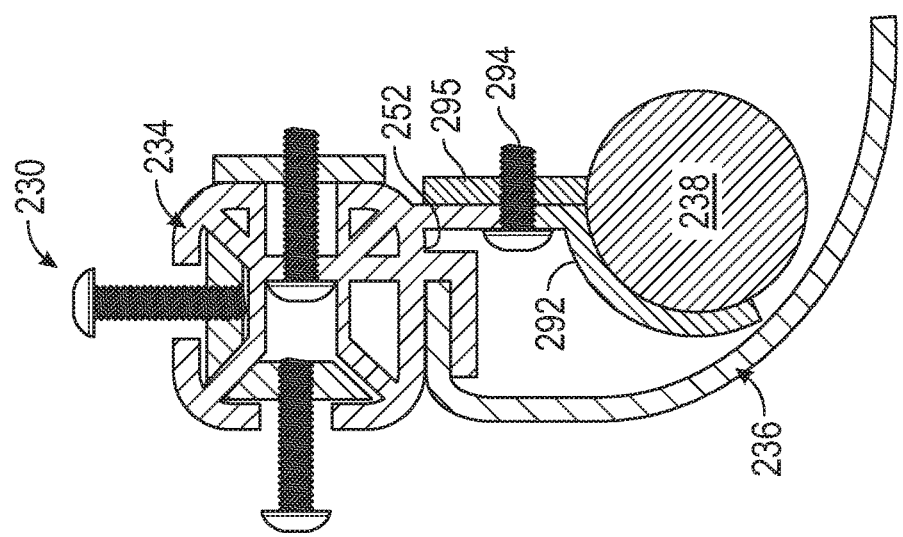
FIG. 8 illustrates an accessory rail system according to another embodiment of this disclosure.

FIG. 8 illustrates another exemplary accessory rail system 230. The accessory rail system 230 is similar to the accessory rail system 30 described above and includes an accessory rail 234, a trim piece 236, and an airbag curtain 238. However, in this embodiment, a mounting flange 292 extends inwardly from a side 252 of the accessory rail 234. The airbag curtain 238 may be mounted to the mounting flange 292 of the accessory rail 234 using one or more fasteners 294. In an embodiment, the fasteners 294 are inserted through a bracket 295 of the airbag curtain 238 to mount the airbag curtain 238 to the mounting flange 292.

Figure 9:
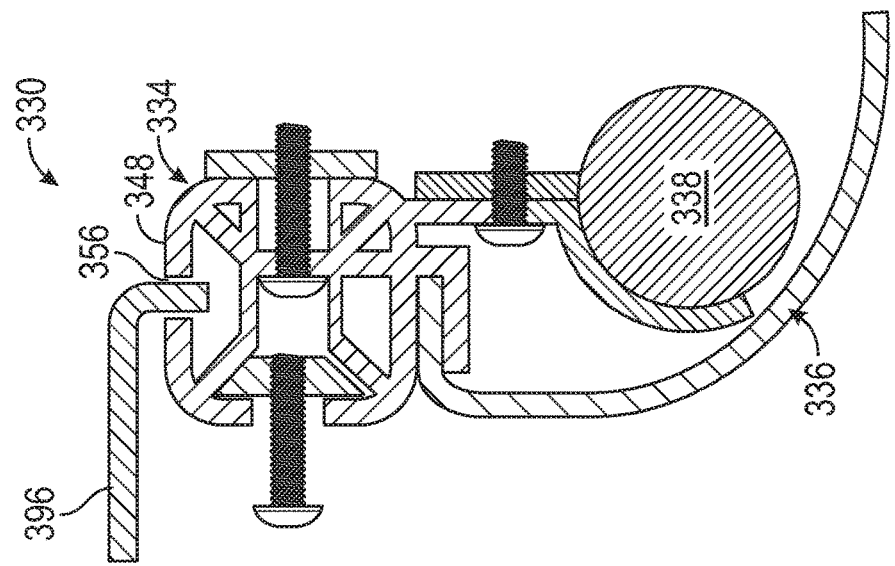
FIG. 9 illustrates an accessory rail system according to yet another embodiment of this disclosure.

FIG. 9 illustrates another exemplary accessory rail system 330. The accessory rail system 330 may include an accessory rail 334, a trim piece 336, an airbag curtain 338, and a roller shade 396. The accessory rail 334, the trim piece 336, and the airbag curtain 338 may generally function in the same manner discussed above. However, in this embodiment, the roller shade 396 may be slidingly accommodated within a longitudinal groove 356 formed within a side 348 of the accessory rail 334.

Figure 10:
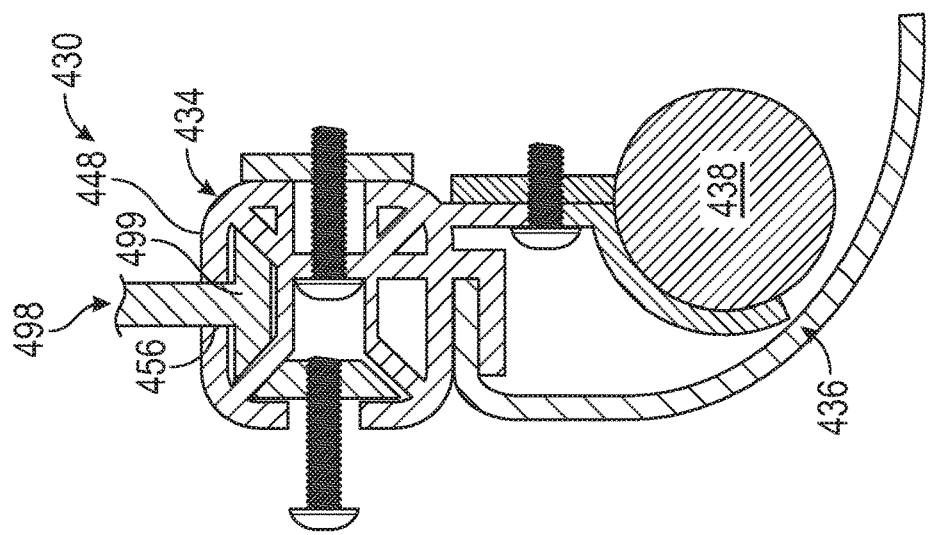
FIG. 10 illustrates an accessory rail system according to yet another embodiment of this disclosure.

FIG. 10 illustrates yet another exemplary accessory rail system 430. The accessory rail system 430 may include an accessory rail 434, a trim piece 436, an airbag curtain 438, and a retractable soft top 498. The accessory rail 434, the trim piece 436, and the airbag curtain 438 may generally function in the same manner discussed above. However, in this embodiment, a slider 499 of the retractable soft top 498 may be slidingly accommodated within a longitudinal groove 456 formed within a side 448 of the accessory rail 434.

The accessory rail systems of this disclosure provide vehicle owners with the ability to accessorize their open-air vehicles without interfering with existing vehicle systems. The vehicles may be accessorized with a multitude of interior and/or exterior accessory devices the can be easily mounted, positioned, re-positioned, and removed as desired by the customer.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle accessory rail system, comprising:
an accessory rail including a first side, a second side, a third side, and a fourth side;
a first longitudinal groove disposed on the first side;
a second longitudinal groove disposed on the second side; and
a trim piece secured at the third side,
wherein the trim piece is secured to a ledge that extends from the third side.

2. The system as recited in claim 1, wherein the accessory rail is an extruded aluminum rail.

3. The system as recited in claim 1, comprising an airbag curtain deployable between a first position behind the trim piece and a second position outward of the trim piece.

4. The system as recited in claim 3, wherein the airbag curtain is mounted to a mounting flange that extends from the third side of the accessory rail.

5. The system as recited in claim 1, comprising a first accessory device movably mounted within the first longitudinal groove and a second accessory device movably mounted within the second longitudinal groove.

6. The system as recited in claim 5, wherein the first accessory device is an exterior accessory device and the second accessory device is an interior accessory device.

7. The system as recited in claim 1, comprising a portion of a roller shade or a retractable soft top slidingly received with the first longitudinal groove.

8. A vehicle accessory rail system, comprising:
an accessory rail including a first side, a second side, a third side, and a fourth side;
a first longitudinal groove disposed on the first side;
a second longitudinal groove disposed on the second side;
a third longitudinal groove on the third side and a fourth longitudinal groove on the fourth side; and
a trim piece secured at the third side.

9. A vehicle accessory rail system, comprising:
an accessory rail including a first side, a second side, a third side, and a fourth side;
a first longitudinal groove disposed on the first side;
a second longitudinal groove disposed on the second side; and
a trim piece secured at the third side,
wherein one of a socket portion and a ball-shaped portion of a ball and socket joint extends from the third side and is configured to connect to the other of the socket portion and the ball-shaped portion of the trim piece.

10. A vehicle, comprising:
a roof including a first frame rail;
an accessory rail secured to the first frame rail and configured to mount a first accessory and a second accessory relative to the vehicle,
wherein the first accessory is movably secured within a first longitudinal groove of the accessory rail and the second accessory is movably secured within a second longitudinal groove of the accessory rail;
a trim piece secured to the accessory rail; and
an airbag curtain secured to the accessory rail or the first frame rail.

11. The vehicle as recited in claim 10, wherein the roof includes a roof opening, and the first accessory is an exterior accessory that extends at least partially through the roof opening.

12. The vehicle as recited in claim 10, wherein the first accessory is an exterior accessory movably secured within the first longitudinal groove at a first side of the accessory rail, and the second accessory is an interior accessory movably secured within the second longitudinal groove at a second side of the accessory rail.

13. The vehicle as recited in claim 12, wherein the trim piece is secured at a third side of the accessory rail, and a fourth side of the accessory rail is mounted to the first frame rail.

14. The vehicle as recited in claim 10, wherein the accessory rail is secured to the first frame rail by a fastener, and once mounted to the first frame rail, the fastener is accessible only from an opposite side of the accessory rail.

15. The vehicle as recited in claim 10, comprising a seal disposed axially between the accessory rail and the first frame rail.

16. The vehicle as recited in claim 10, wherein the accessory rail includes a longitudinal groove configured to receive a bracket of a roof structure of the roof.

17. The vehicle as recited in claim 10, wherein the airbag curtain is mounted to a mounting flange that extends from the accessory rail.

18. A vehicle, comprising:
a roof including a first frame rail;
an accessory rail secured to the first frame rail and configured to mount a first accessory and a second accessory relative to the vehicle;
a trim piece secured to the accessory rail; and
an airbag curtain secured to the accessory rail or the first frame rail,
wherein the first accessory and the second accessory are both interior accessories slidably received within the accessory rail.

19. A vehicle, comprising:
a roof including a first frame rail;
an accessory rail secured to the first frame rail and configured to mount a first accessory and a second accessory relative to the vehicle;
a trim piece secured to the accessory rail; and
an airbag curtain secured to the accessory rail or the first frame rail,
wherein the trim piece includes a bent end portion that is press fit into a gap between a ledge and a side of the accessory rail.

* * * * *